United States Patent [19]

Fredericks et al.

[11] Patent Number: 5,086,655
[45] Date of Patent: Feb. 11, 1992

[54] ORIFICE MEASURING DEVICE

[75] Inventors: George E. Fredericks; Alfred Jaschek, both of Graz, Austria

[73] Assignee: AVL Gesellschaft fuer Verbrennungskraftmaschinen und Messtechnik mbH, Graz, Austria

[21] Appl. No.: 597,298

[22] Filed: Oct. 12, 1990

Related U.S. Application Data

[63] Continuation of Ser. No. 376,182, Jul. 5, 1989, abandoned, which is a continuation of Ser. No. 918,367, Oct. 14, 1986, abandoned.

[30] Foreign Application Priority Data

Oct. 15, 1985 [AT] Austria .................. 2977/85

[51] Int. Cl.$^5$ .............................................. G01F 1/42
[52] U.S. Cl. .................. 73/861.61; 73/861.52
[58] Field of Search .......... 73/861.61, 861.62, 861.58, 73/861.52, 861.42; 138/40

[56] References Cited

U.S. PATENT DOCUMENTS

| | | | |
|---|---|---|---|
| 3,469,446 | 9/1969 | Kochey, Jr. | 73/861.61 |
| 3,521,487 | 7/1970 | Akeley | 73/861.61 |
| 3,733,898 | 5/1973 | Yamamoto et al. | 73/861.52 |
| 4,161,119 | 7/1979 | Brandt, Jr. | 73/861.52 |
| 4,361,050 | 11/1982 | Coussot et al. | 73/861.61 |
| 4,366,718 | 1/1983 | Nelson | 73/861.58 |
| 4,413,532 | 11/1983 | Van Scoy | 73/861.61 |
| 4,503,594 | 3/1985 | Gall et al. | 73/861.61 |
| 4,557,296 | 12/1985 | Byrne | 73/861.61 |
| 4,563,901 | 1/1986 | Singh | 73/861.61 |

FOREIGN PATENT DOCUMENTS 1263882   5/1961   France ................ 73/861.61

OTHER PUBLICATIONS

'Republic Flow Meters', Catalog #700, ©1933, pp. 1-24.

Primary Examiner—Jin F. Ng
Assistant Examiner—Brent A. Swarthout
Attorney, Agent, or Firm—Townsend and Townsend

[57] ABSTRACT

The invention relates to a plate orifice for a or in a measuring device for the flow metering of fluid streams, in particular gas streams, preferably for gas streams present in internal combustion engines, with the fluids, in particular the gases, being guided through at least one plate orifice (restrictor) disposed in a pipe and provided with a sharp edge definig its flow orifice, with a pressure sensor or a pressure measuring line of a differential pressure measuring device or of a differential pressure transducer disposed upstream as well as downstream of the plate orifice, the output signal of the differential pressure measuring device or the differential pressure transducer depending on the differential pressure forming the measuring signal for the fluid flow rate, in particular gas flow rate, through the plate orifice and optionally being fed to an evaluation unit. In plate orifices or measuring devices of this type, problems due to their contamination and their universal usability arise. These problems were overcome according to the invention by providing, in particular for the flow measurements of pulsating fluid streams, preferably gas streams, that the plate orifice is symmetrically formed at least in the zone of the sharp edge, preferably in its zone extending into the interior of the pipe, in relation to a plane passing through the sharp edge of the flow orifice of the plate orifice and that the flank angle ($\alpha$) of the sharp edge is 70° to 110° at the most, preferably 90° at the most. In addition, the invention relates to the embodiment of plate orifices and measuring devices per se.

41 Claims, 2 Drawing Sheets

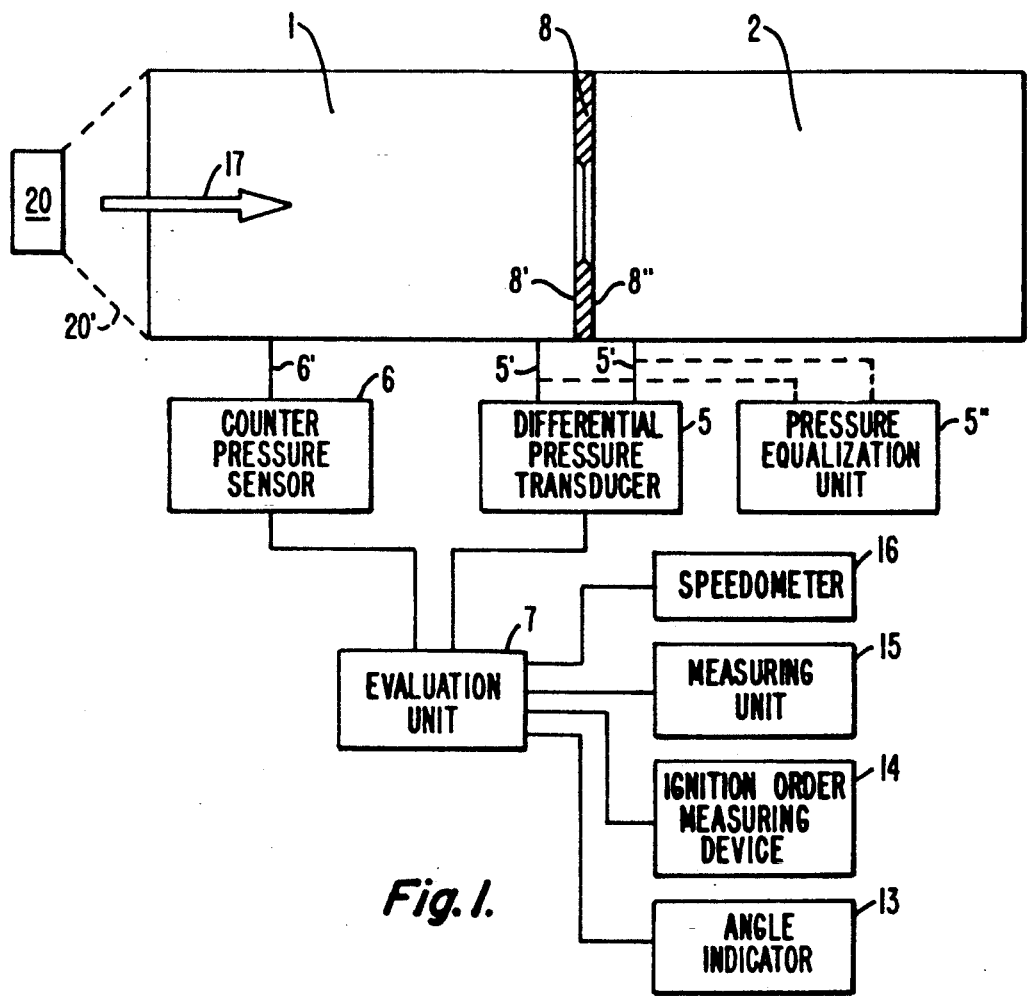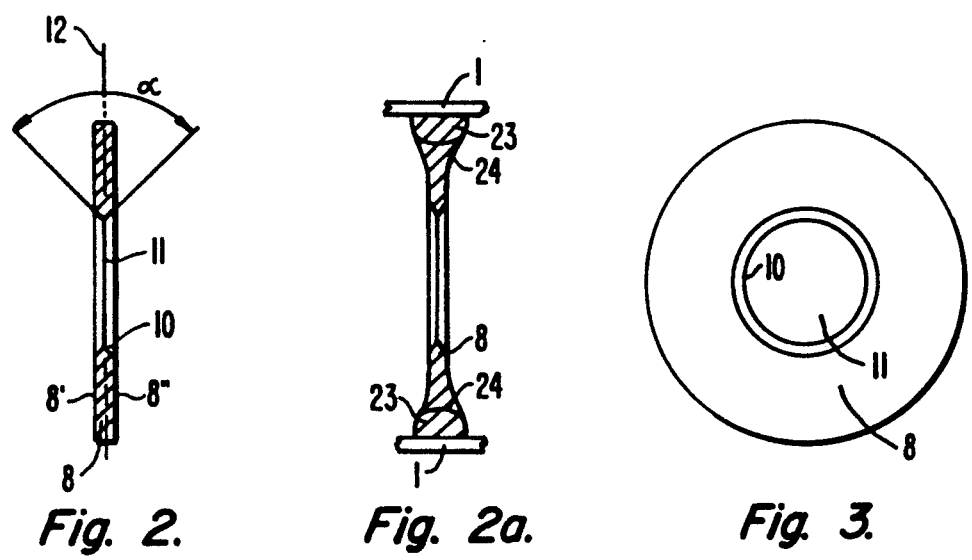

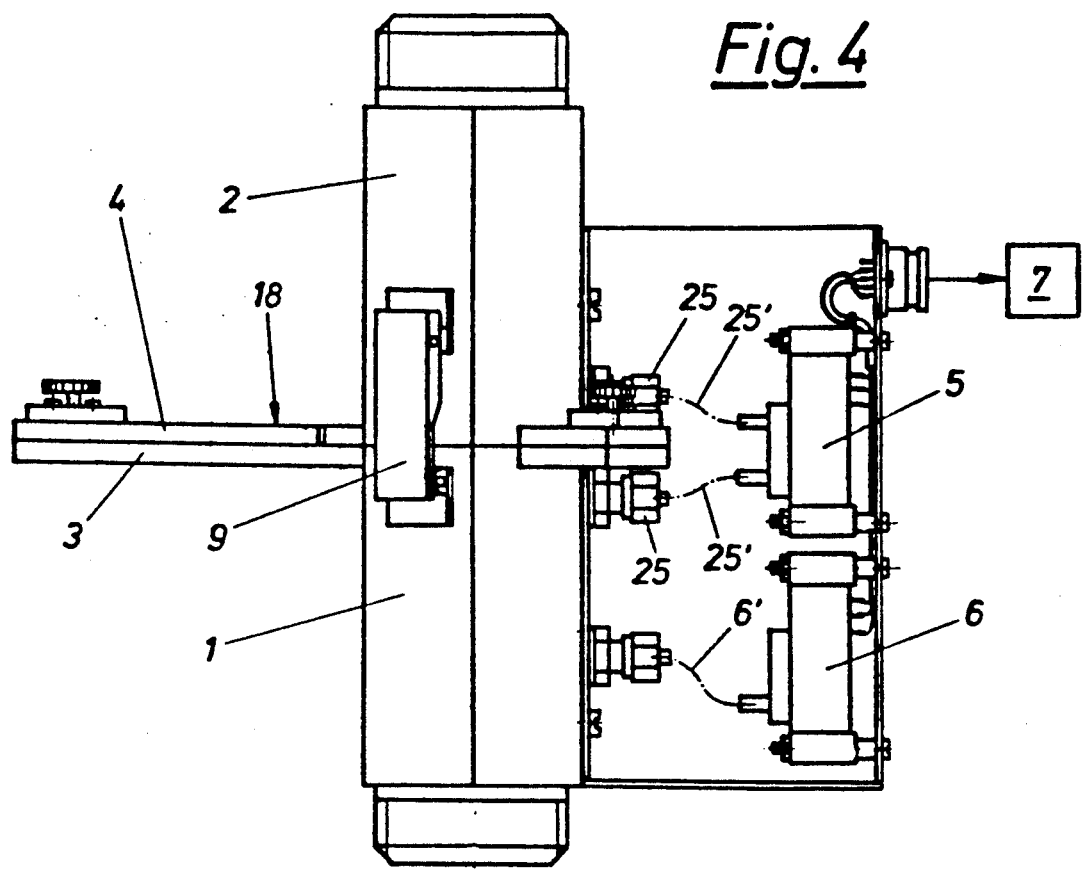
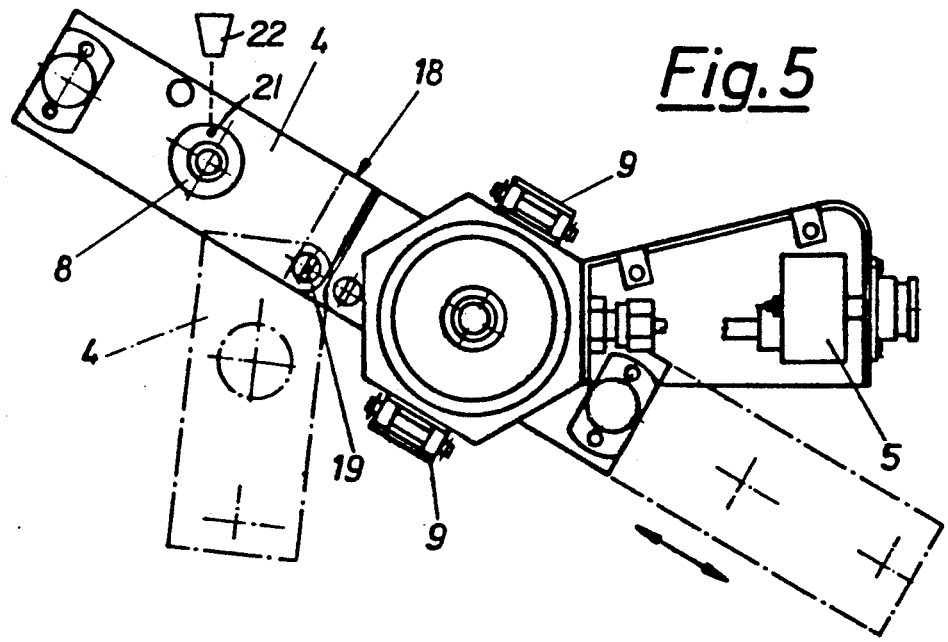

ORIFICE MEASURING DEVICE

This is a continuation of application Ser. No. 376,182, filed July 5, 1989, now abandoned which is a continuation of application Ser. No. 918,367, filed 10/14/86, now abandoned.

BACKGROUND OF THE INVENTION

The invention relates to a plate orifice (restrictor) for a or in a measuring device as well as to measuring devices utilizing said plate orifice for the flow metering of fluid streams, preferably gas streams, in particular for gas streams present in internal combustion engines, with the fluid, in particular the gas, being guided through at least one plate orifice disposed in a pipe and provided with a sharp edge defining its flow orifice and directed radially inwards, with a pressure sensor or pressure measuring line of a differential pressure measuring device or of a differential pressure transducer disposed upstream as well as downstream of the plate orifice, the output signal of the differential pressure measuring device or of the differential pressure transducer depending on the differential pressure forming the measuring signal for the fluid flow rate, in particular gas flow rate, through the plate orifice and optionally being fed to an evaluation unit.

In measuring devices of this type for the flow metering of fluid streams, in particular gas streams, the difference of the measuring signals which are measured by the pressure sensors positioned upstream and downstream of the plate orifice is formed in the differential pressure transducer whose output signal has a designation or characteristic, but not necessarily linear relation to the fluid stream, in particular gas stream, flowing through the plate orifice. As a rule, a simple algorithm exists for determining the rate of flow on the basis of the measuring signal obtained from the differential pressure transducer.

SUMMARY OF THE INVENTION

It is an object of the invention to provide improved plate orifices and a measuring device for the flow metering of fluid streams, in particular gas streams, but particularly for gas streams present in internal combustion engines, such as intake air, blow-by gas, exhaust gas and the like. It is the particular aim of the invention to provide a measuring device for flow metering in which the flow rates of pulsating fluids, in particular gases, i.e. those flowing in both directions, can be measured. In a measuring device of this type, any influence of the measuring signals by contamination is to be prevented, in particular by the embodiments of the plate orifices, and it is to be possible to carry out measurements at low differential pressures and low counter pressures before the plate orifice.

The objects of the invention are achieved in a plate orifice or in a measuring device of the type initially mentioned by providing that in particular for the flow measurements of pulsating fluid streams, in particular gas streams, the plate orifice is symmetrically formed at least in the zone of the sharp edge, in particular in its zone extending into the interior of the pipe, in relation to a plane passing through the sharp edge of the flow orifice of the plate orifice, the flank angle $\alpha$ of the sharp edge being 70° to 110° at the most, preferably 90° at the most.

A plate orifice or a measuring device formed according to the invention is particularly suitable for measuring pulsating fluid streams, as it is possible to measure fluid streams flowing in negative direction at approximately equal flow conditions through the plate orifice (restrictor) so that exact measuring results can be obtained in pulsating fluid streams, in particular gas streams, in both flowing directions. A contamination of the flow orifice is prevented by forming the flow orifice with a symmetrical sharp edge.

According to a preferred embodiment of the invention, a counter pressure sensor or a counter pressure measuring line of a counter pressure sensor for determining the counter pressure prevailing before the plate orifice is provided in the pipe on one side of the plate orifice in case of a preferred or predominant flow direction of the fluid stream in particular upstream of the plate orifice or if the measuring device is connected to a crankcase ventilation of an internal combustion engine in the zone between the crankcase ventilation and the plate orifice. This counter pressure sensor serves for determining the counter pressure prevailing before the plate orifice if the measuring device is connected, for instance, to the crankcase ventilation of an internal combustion engine and blow-by gas streams are to be measured. In this case, the counter pressure prevailing before the plate orifice plays a certain part because the counter pressure generated by the plate orifice must not exceed a certain value. It is convenient for measuring the gas streams of internal combustion engines, if the measuring device is connected to the crankcase ventilation, to use the plate orifice for adjusting a differential pressure of 0.3 to 100 mm $H_2O$ and a counter pressure of less than 10 mm $H_2O$.

A further purpose of the counter pressure sensor is to provide a measuring signal by which a continuity of the measurements during the zero point adjustment (equalization) of the differential pressure transducer required from time to time can be obtained.

For this purpose, it is provided according to the invention that during the period of zero point adjustment (equalization) of the differential pressure transducer, a measuring signal depending on the pressure value of the counter pressure sensor and corresponding to a predetermined relation between the pressure measured by the counter pressure sensor and the fluid stream, in particular gas stream, flowing through the plate orifice, is fed to the evaluation unit as a measuring signal for the flow rate of the fluid, in particular gas, through the plate orifice.

As an alternative to this, the measuring signal fed to the evaluation unit for the period of zero point adjustment of the differential pressure transducer for the flow rate of the fluid stream, in particular gas stream, through the plate orifice is the measuring signal of the differential pressure transducer available at the beginning of the zero point adjustment of the differential pressure transducer or the mean value of the measuring signals available at the beginning of zero point adjustment and at the resumption of measuring of the differential pressure transducer.

It is particularly convenient to carry out the zero point adjustment (equalization) of the differential pressure transducer by providing for the pressure measuring lines to be releasable or disconnectable from the pipe and connectable to a pressure equalization unit by means of which both pressure measuring lines are simultaneously subjectable to equal pressure, preferably atmospheric pressure, or by means of which both lines are pressurelessly connectable.

For the measuring of gas streams in internal combustion engines, the evaluation unit is additionally provided with the signals of an angle indicator and/or an ignition order measuring device and/or a measuring unit for the number of cylinders and/or a speedometer in addition to the measuring signals of the differential pressure transducer and/or the counter pressure sensor.

In this type of embodiment of the measuring device, the measuring results can be associated, for instance, with the individual cylinders of an internal combustion engine so as to allow conclusions as to their function. It is convenient if the differential pressure transducer has dynamics of about 1000 Hz which allow measurements in a reaction time of about 1 ms, which short reaction time is suitable for dynamic measurements performed, for instance, in the air intake pipe, on the crankcase ventilation or the like.

In order to obtain a measuring device of simple structure and to prevent an impairment of the measuring signals by the constructive embodiments required for universal use and resetting, a plate orifice support carrying a plurality of optionally different plate orifices displaceable in relation to the pipe is disposed in the pipe of the measuring device optionally composed of two pipe sections. For this, it is convenient if the pipe sections disposed upstream and downstream of the plate orifice support are sealingly lockable to one another by means of locking elements. This allows for a simple and rapid exchange with short measuring interruption in the event of contamination of the plate orifices used or the choice of a different measuring range.

Conveniently, the plate orifice support and/or the plate orifices are provided with markings corresponding to the position of the plate orifice support and/or the characteristics of the plate orifices and electronic scanning devices are preferably provided by means of which the markings or characteristic data of the plate orifices are fed to the evaluation unit. This permits an automatic plate orifice identification in the evaluation unit as the evaluation unit is provided with signals indicating which plate orifice is used at present.

According to a further feature of the invention, the plate orifice symmetrically formed at least on the zone of the sharp edge can be of uneven thickness particularly increasing close to the pipe wall outside of the sharp edge and the transition from the sharp edge to the plate orifice flanks and/or the transition of the flanks between differently thick plate orifice sections can be continuous or discontinuous or stepped. The embodiment may be so selected that the sharp symmetrical plate orifice edge sits in particular symmetrically on an inner ring which is supported, in particular symmetrically, by a thicker outer ring disposed on the inner wall of the pipe, with the inner as well as the outer ring conveniently symmetrically arranged or formed in relation to the plane passing through the sharp edge.

The invention is explained in detail in the following under reference to the accompanying drawing.

BRIEF DESCRIPTION OF THE DRAWINGS

FIG. 1 shows an elementary view of a measuring device according to the invention with a plate orifice according to the invention.

FIG. 2 and 2a are sectional views through plate orifices according to the invention.

FIG. 3 shows a plan view of a plate orifice according to the invention.

FIG. 4 shows an elevational view of a measuring device according to the invention.

FIG. 5 is a top view of the measuring device according to the invention shown in FIG. 4.

DETAILED DESCRIPTION OF THE PREFERRED EMBODIMENT

FIG. 1 shows the elementary view of a measuring device according to the invention. In a pipe, which in the instant case is formed of two pipe sections 1, 2, a plate orifice (restrictor) 8 is arranged. The plate orifice 8 is arranged between the two pipe sections 1, 2 and the connection between the plate orifice 8 and the pipe sections 1, 2 is fluid-tight or gas-tight. A differential pressure transducer 5 measures the pressure on both sides of the plate orifice 8 via pressure measuring lines 5' terminating in the pipe sections 1, 2 at both sides of the plate orifice 8 or via electric measuring lines leading to pressure sensors disposed on both sides of the plate orifice 8 and thus calculates the differential pressure which constitutes a measure for the flow or amount of the fluid or gas through the plate orifice 8. An electric measuring signal corresponding to the differential pressure is fed from the differential pressure transducer to the evaluation unit.

On one side of the plate orifice or restrictor 8, in particular on the side on which the measuring device is connected to a fluid line 20', in particular gas line, discharging gases, a counter pressure sensor 6 is connected via a pressure measuring line 6' to the pipe section 1 in order to measure the counter pressure generated by the plate orifice 8 prevailing before the plate orifice 8. The electric output signal of the counter pressure sensor 6 is also fed to the evaluation unit 7. Instead of the counter pressure sensor 6, a pressure sensor 25 (FIG. 4, 5) whose electric output signal is fed to the evaluation unit 7 can be installed in the pipe wall.

The formula known per se which represents the relation between the flow rate through plate orifice 8 and the pressure differential measured reads as follows: $Q = (\text{data } p/k)^{\frac{1}{2}}$, delta p being differential pressure, the known constant k being a function of the density, temperature viscosity and contraction number of the fluid. The relation between the flow rate through the orifice and the counter pressure prevailing before the plate orifice for certain fluids can also be determined by measurements. The counter pressure is essentially determined by the ratio of the pipe diameter to the flow orifice 11 of the plate orifice 8 and further depends on the Reynolds number and the contraction number.

The arrow 17 in FIG. 1 in the present case shows a preferred or predominent flow direction of the fluid, in particular gas, in the pipe of the measuring device which may be superimposed by pulsations. Pulsating fluid streams or gas streams can also be measured, as the measuring device, due to the form of the plate orifice (restrictor) 8, is also suitable for the measuring of negative flow directions (counter to arrow 17). Reference number 20 in FIG. 1 designates a fluid source, e.g. a crankcase ventilation, to which the measuring device is connected via a pipe 20'.

The plate orifice installed in the pipe of the measuring device is represented in section in FIG. 2. The plate orifice 8 has two mutually parallel, axially spaced front faces 8', 8". Between the front faces 8', 8" of the plate orifice 8 extends their plane of symmetry 12 which thus has the same distance from either of the front faces 8', 8". A sharp edge 10 inwardly defining the flow orifice 11 of the plate orifice 8 extends in the plane of symmetry 12 of the plate orifice 8. The angle formed by the flanks of the sharp edges is 70° to 110°, but preferably the angle is one of 90°. The selection of this value permits the measuring of pulsating fluid streams, in particular gas streams and prevents a contamination by deposits on the side of the plate orifice 8 not subjected to the stream within the edge zone and a distortion of the measuring results.

FIG. 2a shows, in an exemplary manner, an outer ring 23 carrying the annular plate orifice 8. As shown, the plate orifice 8 could be thickened (at 24) in the outer zone.

FIG. 3 shows a plan view of the plate orifice 8 represented in section in FIG. 2. The dimensions of the flow orifice 11 of the plate orifice 8 are selected as a function of the desired flow number, the Reynolds number of the fluid, in particular gas, its contraction number or the desired range of the differential pressure or of the counter pressure. The plate orifice 8 with the edge angle shown is particularly suitable for ranges of a differential pressure of 0.3 to 100 mm $H_2O$ and ranges of a counter pressure of less than 10 mm $H_2O$, low flow numbers and low Reynolds numbers being advantageous for the fluids, in particular gases, measured. The flow orifice 11 is preferably circular, but can also have an elliptical cross section. The flow orifice 11 is preferably arranged centrally in the pipe or coaxially in relation to the axis of the pipe. The plate orifice 8 is symmetrical in relation to the plane 12 and preferably has parallel front faces 8', 8". Maintaining the symmetry, the front faces can also diverge or converge in the direction of the pipe or extend in a predetermined manner deviating from a straight line. It is also preferred to form the plate orifice 8 centrically symmetrical in relation to the flow orifice 11

In the evaluation unit 7 shown in FIG. 1, the measuring signal obtained from the differential pressure transducer 5 is converted to a signal corresponding to the mass stream of the fluid, in particular gas, through the plate orifice 8. The evaluation unit 7 can also set averaging times, measure and monitor the counter pressure, recognize plate orifice contaminations on the basis of the measuring signals of the counter pressure sensor 6 and assure a continuity of the measurement at zero point equalization of the differential pressure transducer 5.

During the zero point adjustment of the differential pressure transducer 5, the measuring signal fed from the counter pressure sensor 6 to the evaluation unit 7 can be used as a measuring value for the flow rate of the fluid, in particular gas, through the orifice opening 11. This is preceded by measurements determining the ratio between the flow of the fluid, in particular gas, through the flow orifice 11 and the counter pressure before the plate orifice 8 which is taken by the counter pressure sensor 6 and the counter pressure actually prevailing and measured during the zero point adjustment is used as the measuring signal for the flow rate.

The pressure equalization unit 5" can be used for pressure-shorting pressure measuring lines 5' or subjecting them to atmospheric pressure after they have been disconnected from pipe 1.

It is for instance also possible during the entire period of zero point equalization of the differential pressure transducer 5 to use the measuring value of the counter pressure obtained at the beginning of zero point adjustment as a measuring signal for the flow through the flow orifice 11.

A further possibility consists in using a mean value formed of the measuring values of the counter pressure or the differential pressure at the beginning and at the end of the zero point adjustment as a measuring signal for the duration of zero point adjustment.

An appropriate choice of the measuring signal to be used for the duration of zero point equalization is made by the appropriate adjustment of the evaluation unit 7. This way of proceeding assures the availability of measuring signals corresponding to the flow rate.

In order to be able to associate the measuring results in measuring gas streams in internal combustion engines which are usually measurements in the intake pipe or at the crankcase ventilation, with the behavior or faulty behavior of individual cylinders, it is convenient to connect the evaluation unit 7 with an angle indicator 13 and/or an ignition order measuring device 14 and/or a measuring unit 15 for the number of cylinders and/or a speedometer 16 which supply the evaluation unit 7 with corresponding data or measuring signals which are appropriately linked to one another in the evaluation unit 7.

By a rapid response time of the differential pressure transducer 5, it is possible, for instance if the measuring device is used for measuring the blow-by gas in internal combustion engines, to measure each cylinder separately, the evaluation unit 7 can be provided with displays for the maximum, the minimum, the distance from peak to peak and for a mean value of the gas flow rate for each individual cylinder.

FIG. 4 shows a schematic elevational view of a measuring device shown in plan view in FIG. 5. A pipe composed of pipe sections 1, 2 of the measuring device is pierced by a plate orifice support 18 on which a plurality of optionally different plate orifices 8 is arranged. The two pipe sections 1, 2 are tightly held together by locking means 9 and can be forced apart for instance by a spring, on releasing of said locking means, in order to allow a displacement of the plate orifice support 18 and the introduction of a different plate orifice 8 into the pipe. For replacing a plate orifice 8, it is convenient to form the plate orifice support 18 of a bottom part 3 and a top part 4 pivotally disposed around an axis 19 in relation to the former, the plate orifice 8 being insertable between these two parts. FIG. 4 shows pressure sensors 25 disposed on both sides of the plate orifice 8 or plate orifice support 18 which feed the electric output signals corresponding to the pressure measured via lines 25' to the differential pressure transducer 5 which then forms a differential signal and passes this to the evaluation unit 7.

In a similar manner, pressure sensors installed in the pipe and leading to the differential pressure transducer 5 and to the counter pressure sensor 6 via electric measuring lines or pressure lines terminating in the pipe and leading from the pipe to the differential pressure transducer and to the counter pressure sensor can be used, in which case these are provided with pressure-sensitive means converting pressure fluctuations to electric signals.

The plate orifice support 18 can be provided with a positioning means permitting an exact centric position of the plate orifices 8 supported on the plate orifice support 18. While one plate orifice 8 is within the pipe of the measuring device, the other plate orifices 8 supported by the plate orifice support 18 can be replaced or cleaned.

In order to be able to identify the plate orifice 8 installed in the measuring device and to feed a corresponding measuring signal to the evaluation unit 7, the plate orifices 8 are provided with appropriate markings 21, such as pressure contacts, projections or the like and scanned by scanning means 22 whose signals are fed to the evaluation unit 7.

The plate orifice or measuring device according to the invention is particularly suitable for engine test stands, but can also be installed in vehicles, for instance for monitoring the engine.

It is noted that the plate orifice or measuring device according to the invention is on principle suitable for all fluids, i.e. gases and liquids, as liquid streams and gas streams shows a basically identical flow behavior. In a preferred way, however, the plate orifice or measuring device according to the invention is used for measurements in internal combustion engines.

The flank angle of the sharp edge 10 according to the invention is 110° at the most, conveniently 70° to 110°, preferably 90° at the most.

According to a preferred embodiment of the invention, the measuring device is attached to the crankcase ventilation of an internal combustion engine.

According to the invention, it can further be provided that the front faces of the plate orifice diverge or converge deviating from a plane towards the inner wall of the pipe.

The invention further comprises processes for the zero point adjustment (equalization)of the differential pressure transducer in a measuring device provided with a plate orifice according to the invention. A process of this type is characterized according to the invention in that during the zero point adjustment of the differential pressure transducer 5, a measuring signal depending on the pressure value of the counter pressure sensor 6 and corresponding to a predetermined ratio between the pressure measured by the counter pressure sensor 6 and the fluid stream, in particular gas stream, flowing through the plate orifice 8, is fed to the evaluation unit 7 as a measuring signal for the flow rate of the fluid, in particular gas, through the plate orifice 8. A further process is characterized according to the invention in that at the beginning of the zero point adjustment of the differential pressure transducer 5, the value of the counter pressure is measured by means of the counter pressure sensor 6 and that during the period of zero point adjustment of the differential pressure transducer 5, the latter is disconnected from the pipe 1, while the counter pressure sensor 6 remains connected to the pipe 1, on the one hand, and to the evaluation unit 7, on the other hand, so that the measuring signal for the flow rate of the fluid, in particular gas, through the plate orifice 8 is the measuring signal of the differential pressure transducer 5 available at the beginning of zero point adjustment. Another process is characterized according to the invention in that first, the mean value of the measuring signals of the differential pressure transducer 5 available at the beginning of zero point adjustment and resumption of measuring is formed and that during the period of zero point adjustment of the differential pressure transducer 5, the latter is disconnected from the pipe 1, while the counter pressure sensor 6 remains connected to the pipe 1, on the one hand, and to the evaluation unit 7, on the other hand, so that the measuring signal for the fluid flow, in particular gas flow, through the plate orifice 8 fed to the evaluation unit 7 is the previously mentioned mean value.

The plate orifice and the measuring device each constitute a separate subject matter of the invention.

We claim:

1. A measuring device for the flow metering of fluid streams comprising at least one orifice plate disposed within a pipe and having an orifice defined by a sharp, radially inwardly directed edge, said fluid being guided through said orifice, said plate being of a substantially rigid material, at least partially defined by opposite, substantially parallel sides facing flow directions through the pipe, said measuring device further including a differential pressure measuring device comprising at least two pressure sensors, one of said pressure sensors being disposed upstream and one pressure sensor being disposed downstream of said orifice, said differential pressure measuring device including means for producing output signals dependent upon the differential pressure forming a measuring signal for the fluid flow rate through said orifice, a plane passing through the sharp edge of the orifice of the plate, said sharp edge being formed by first and second, in cross-section straight surfaces which converge at an angle of no more than about 110°, the surfaces being symmetrical about said plane and forming a flank angle $\alpha$ of the sharp edge of at most 110° at the flow orifice.

2. A measuring device according to claim 1, wherein the flank angle $\alpha$ is between 70° to 110° at the flow orifice.

3. A measuring device according to claim 1, wherein the flank $\alpha$ is at most 90° at the flow orifice.

4. A measuring device according to claim 1, further including a counter pressure sensor for determining the counter pressure prevailing upstream of the solid plate orifice in the pipe on one side of the plate orifice in the case of a preferred flow direction of the fluid stream.

5. A measuring device for the flow metering of fluid streams comprising at least one solid plate orifice disposed within a pipe, said fluid being guided through said plate orifice, said plate orifice having a sharp edge defining a flow orifice and directed radially inwardly, said measuring device further including a differential pressure measuring device comprising at least two pressure sensors, one of said pressure sensors being disposed upstream and one pressure sensor being disposed downstream of said plate orifice, said differential pressure measuring device including means for producing output signals dependent upon the differential pressure forming a measuring signal for the fluid flow rate through said plate orifice, a plane passing through the sharp edge of the flow orifice of the plate orifice, said sharp edge being symmetrical about said plane and forming a flank angle $\alpha$ of the sharp edge of at most 110° at the flow orifice, wherein the differential pressure measuring device comprises a differential pressure transducer having pressure measuring lines, wherein pressure equalization means are provided and wherein said lines connect said transducer with the pipe for achieving zero point adjustment of said differential pressure by said pressure equalization means, said pressure measuring lines are disconnectable from the pipe by means of which both pressure measuring lines are simultaneously subjected to equal pressure.

6. A measuring device for the flow metering of fluid streams comprising at least one plate orifice disposed within the pipe, said fluid being guided through said plate orifice, said plate orifice having a sharp edge defining a flow orifice and directed radially inwardly, said measuring device further including a differential pressure measuring device comprising at least two pressure sensors, one of said pressure sensors being disposed upstream and one pressure sensor being disposed downstream of said plate orifice, said differential pressure measuring device including means for producing output signals dependent upon the differential pressure forming a measuring signal for the fluid flow rate through said plate orifice, a plane passing through the sharp edge of the flow orifice of the plate orifice, said sharp edge being symmetrical about said plane and forming a flank angle $\alpha$ of the sharp edge of at most 110°, wherein the differential pressure measuring device comprises a differential pressure transducer having pressure measuring lines, wherein pressure equalization means are provided and wherein said lines connect said transducer with the pipe for achieving a zero point adjustment of said differential pressure transducer by said pressure equalization means, said pressure measuring lines are disconnectable from the pipe by means of which both pressure measuring lines are simultaneously subjectable to equal pressure and wherein said device is adapted to measure the gas stream in internal combustion engines and wherein an evaluation unit and an angle mark indicator are provided, wherein said indicator is connected with said evaluation unit and supplies said unit with measuring data in addition to measuring signals of the differential pressure transducer.

7. A measuring device for the flow metering of fluid streams comprising at least one plate orifice disposed within a pipe, said fluid being guided through said plate orifice, said plate orifice having a sharp edge defining a flow orifice and directed radially inwardly, said measuring device further including a differential pressure measuring device comprising at least two pressure sensors, one of said pressure sensors being disposed upstream and one pressure sensor being disposed downstream of said plate orifice, said differential pressure measuring device including means for producing output signals depending upon the differential pressure forming an orifice, a plane passing through the sharp edge of the flow orifice of the plate orifice, said sharp edge being symmetrical about said plane and forming a flank angle $\alpha$ of the sharp edge of at most 110° and wherein said device is adapted to measure the gas stream in internal combustion engines, and wherein an evaluation unit and an ignition order measuring device are provided, wherein the device is connected with said evaluation unit and supplies said unit with measuring data in addition to measuring signals of the differential pressure transducer.

8. A measuring device for the flow metering of fluid streams comprising at least one plate orifice disposed within a pipe, said fluid being guided through said plate orifice, said plate orifice having a sharp edge defining a flow orifice and directed radially inwardly, said measuring device further including a differential pressure measuring device comprising at least two pressure sensors, one of said pressure sensors being disposed upstream and one pressure sensor being disposed downstream of said plate orifice, said differential pressure measuring device including means for producing output signals depending upon the differential pressure forming a measuring signal for the fluid flow rate through said plate orifice, a plane passing through the sharp edge of the flow orifice of the plate orifice, said sharp edge being symmetrical about said plane and forming a flank angle $\alpha$ of the sharp edge of at most 110° and wherein said device is adapted to measure the gas stream in internal combustion engines and wherein an evaluation unit and a measuring unit for the number of cylinders are provided, wherein said unit is connected with said evaluation unit and supplies said unit with measuring data in addition to measuring signals of the differential pressure transducer.

9. A measuring device for the flow metering of fluid streams comprising at least one plate orifice disposed within a pipe, said fluid being guided through said plate orifice, said plate orifice having a sharp edge defining a flow orifice and directed radially inwardly, said measuring device further including a differential pressure measuring device comprising at least two pressure sensors, one of said pressure sensors being disposed upstream and one pressure sensor being disposed downstream of said plate orifice, said differential pressure measuring device including means for producing output signals depending upon the differential pressure forming a measuring signal for the fluid flow rate through said plate orifice, a plane passing through the sharp edge of the flow orifice of the plate orifice, said sharp edge being symmetrical about said plane and forming a flank angle $\alpha$ of the sharp edge of at most 110° and wherein said device is adapted to measure the gas stream in internal combustion engines and wherein an evaluation unit and a speedometer are provided, wherein said speedometer is connected with said evaluation unit and supplies said unit with measuring data in addition to measuring signals of the differential pressure transducer.

10. A measuring device for the flow metering of fluid streams comprising at least one plate orifice disposed within a pipe, said fluid being guided through said plate orifice, said plate orifice having a sharp edge defining a flow orifice and directed radially inwardly, said measuring device further including a differential pressure measuring device comprising at least two pressure sensors, one of said pressure sensors being disposed upstream and one pressure sensor being disposed downstream of said plate orifice, said differential pressure measuring device including means for producing output signals dependent upon the differential pressure forming a measuring signal for the fluid flow rate through said plate orifice, a plane passing through the sharp edge of the flow orifice of the plate orifice, said sharp edge being symmetrical about said plane and forming a flank angle $\alpha$ of the sharp edge of at most 110°, and wherein the device is adapted to measure the gas stream of an internal combustion engine, the internal combustion engine comprising a crankcase, said crankcase having a ventilation, the measuring device being connected to said crankcase ventilation and being provided with a pressure adjusting means and the plate orifice being used to adjust by said adjusting means a differential pressure of 0.03 to 100 mm $H_2O$ and a counter pressure of less than 10 mm $H_2O$.

11. A measuring device for the flow metering of fluid streams comprising at least one plate orifice disposed within a pipe, said fluid being guided through said plate orifice, said plate orifice having a sharp edge defining a flow orifice and directed radially inwardly, said measuring device further including a differential pressure measuring device comprising at least two pressure sensors, one of said pressure sensors being disposed upstream and one pressure sensor being disposed downstream of said plate orifice, said differential pressure measuring device including means for producing output signals dependent upon the differential pressure forming a measuring signal for the fluid flow rate through said plate orifice, a plane passing through the sharp edge of the flow orifice of the plate orifice, said sharp edge being symmetrical about said plane and forming a flank angle α of the sharp edge of at most 110°, and further comprising a plate orifice support carrying a plurality of plate orifices displaceable in relation to the pipe and disposed in the pipe of the measuring device, said pipe comprising two pipe sections.

12. A measuring device according to claim 11, including locking elements for sealingly locking the pipe sections disposed upstream and downstream of said plate orifice support to one another.

13. A measuring device according to claim 11, wherein said output signals include data characteristic of the plate orifices and wherein the plate orifices comprise markings corresponding to the data characteristic of the plate orifices and further comprising electronic scanning devices for interpreting the markings, said scanning devices being connected with the evaluation unit, so that the characteristic data of the plate orifices are fed to the evaluation unit.

14. A measuring device for the flow metering of fluid streams comprising at least one solid plate orifice disposed within a pipe, said fluid being guided through said plate orifice, said plate orifice having a sharp edge defining a flow orifice and directed radially inwardly, said measuring device further including a differential pressure measuring device comprising at least two pressure sensors, one of said pressure sensors being disposed upstream and one pressure sensor being disposed downstream of said plate orifice, said differential pressure measuring device including means for producing output signals dependent upon the differential pressure forming a measuring signal for the fluid flow rate through said plate orifice, a plane passing through the sharp edge of the flow orifice of the plate orifice, said sharp edge being symmetrical about said plane and forming a flank angle α of the sharp edge of at most 110° at the flow orifice, and wherein the plate orifice has differently thick plate sections, a section of less thickness near the sharp edge and a section with a zone of greater thickness close to the pipe wall away from the sharp edge, including a continuous transition from the sharp edge to said zone of greater thickness.

15. A measuring device for the flow metering of fluid streams comprising at least one plate orifice disposed within a pipe, said fluid being guided through said plate orifice, said plate orifice having a sharp edge defining a flow orifice and directed radially inwardly, said measuring device further including a differential pressure measuring device comprising at least two pressure sensors, one of said pressure sensors being disposed upstream and one pressure sensor being disposed downstream of said plate orifice, said differential pressure measuring device including means for producing output signals dependent upon the differential pressure forming a measuring signal for the fluid flow rate through said plate orifice, a plane passing through the sharp edge of the flow orifice of the plate orifice, said sharp edge being symmetrical about said plane and forming a flank angle α of the sharp edge of at most 110°, and wherein the plate has differently thick plate sections, a section of less thickness near the sharp edge and a section with a zone of greater thickness close to the pipe wall away from the sharp edge, including a continuous transition from the sharp edge to said zone of greater thickness, and wherein the plate orifice is a ring, said ring consisting of an inner ring part and an outer part disposed on the inner wall of the pipe and supporting the inner ring part, the inner and the outer ring parts being symmetrically arranged in relation to the plane passing through the sharp edge, and wherein the sharp symmetrical plate orifice edge is provided symmetrically on the inner ring part.

16. A method for zero point adjustment of a differential pressure measuring device comprising at least one plate orifice disposed within a pipe, a fluid being guided through said plate orifice, said plate orifice having a sharp edge defining a flow orifice and directed radially inwardly, said measuring device further comprising a differential pressure measuring device comprising at least one pressure sensor disposed upstream and one pressure sensor disposed downstream of said plate orifice, said method comprising the steps of the differential pressure measuring device producing output signals dependent upon the differential pressure forming a measuring signal for the fluid flow rate through said plate orifice, providing a plane passing through the sharp edge of the flow orifice of the plate orifice, said sharp edge being symmetrical about said plane and forming a flank angle, said differential pressure measuring device comprising a differential pressure transducer having pressure measuring lines for connecting said transducer with the pipe and further comprising the steps of disconnecting the pressure measuring lines from the pipe and for simultaneously subjecting the pressure measuring lines to equal pressure, said differential pressure transducer comprising a plate orifice, a counter pressure sensor, an evaluation unit for producing measuring signals dependent upon the pressure value of the counter pressure sensor as a measuring signal for the flow rate of the fluid through the plate orifice.

17. A method for zero point adjustment of a differential pressure measuring device comprising at least one plate orifice disposed within a pipe, a fluid being guided through said plate orifice, said plate orifice having a sharp edge defining a flow orifice and directed radially inwardly, said measuring device further comprising a differential pressure measuring device comprising at least one pressure sensor disposed upstream and one pressure sensor disposed downstream of said plate orifice, said method comprising the steps of the differential pressure measuring device producing output signals dependent upon the differential pressure forming a measuring signal for the fluid flow rate through said plate orifice, providing a plane passing through the sharp edge of the flow orifice of the plate orifice, said sharp edge being symmetrical about said plane and forming a flank angle, said differential pressure measuring device comprising a differential pressure transducer having pressure measuring lines for connecting said transducer with the pipe and further comprising the steps of disconnecting the pressure measuring lines from the pipe and for simultaneously subjecting the pressure measuring lines to equal pressure, said differential pressure transducer comprising a plate orifice, a counter pressure sensor, further comprising the step of feeding the measuring signal of the differential pressure transducer read at the beginning of the zero point adjustment of differential pressure transducer for the flow rate of the fluid stream through the plate orifice to an evaluation unit.

18. The method as recited in claim 17, wherein a measuring signal is fed to the evaluation unit, which signal is the mean value of a measuring signal available at the beginning of zero point adjustment and of a measuring signal at the resumption of measuring of the differential pressure transducer.

19. A solid plate orifice for a measuring device for the flow metering of fluid streams comprising at least one orifice plate disposed within a pipe and having an orifice defined by a sharp, radially inwardly directed edge, said fluid being guided through said orifice, said plate being of a substantially rigid material, at least partially defined by opposite, substantially parallel sides facing flow directions through the pipe and including first and second, in cross-section, straight converging surfaces which form the sharp edge defining the orifice, a plane passing through the sharp edge of the orifice of the plate, said first and second surfaces and therewith said sharp edge being symmetrical about said plane and forming a flank angle $\alpha$ of the sharp edge of 110° at most at the flow orifice.

20. A plate orifice according to claim 19, wherein the flank angle is 70° to 110° at the flow orifice.

21. A plate orifice according to claim 19, wherein the flank angle is 90° at most at the flow orifice.

22. A plate orifice for a measuring device for the flow metering of fluid streams comprising at least one plate orifice disposed within a pipe, said fluid being guided through said plate orifice, said plate orifice including a sharp edge defining a flow orifice and directed radially inwardly, a plane passing through the sharp edge of the flow orifice of the plate orifice, said sharp edge being symmetrical about said plane and forming a flank angle of the sharp edge, forming an angle of 110° at most, comprising markings corresponding to a characteristic data of the plate orifices readable by electronic scanning devices, a means for feeding said characteristic data, by said means the characteristic data are fed to an evaluation unit.

23. A plate orifice according to claim 19 the plate having a portion of greater thickness close to the pipe wall outside of the sharp edge and a continuous transition from the sharp edge to the portion of greater thickness.

24. A solid plate orifice for a measuring device for the flow metering of fluid streams comprising at least one plate orifice disposed within a pipe, said fluid being guided through said plate orifice, said plate orifice including a sharp edge defining a flow orifice and directed radially inwardly, a plane passing through the sharp edge of the flow orifice of the plate orifice, said sharp edge being symmetrical about said plane and forming a flank angle $\alpha$ of the sharp edge, forming an angle of 110° at most;
the plate having a portion of greater thickness close to the pipe wall outside of the sharp edge and a continuous transition from the sharp edge to the portion of greater thickness, wherein the plate is a ring, said ring consisting of an inner ring part symmetrically provided with said sharp edge of the plate orifice, and a thicker outer ring part disposed on the inner wall of the pipe and supporting said inner ring part, the inner and the outer ring parts being symmetrically arranged in relation to the plane passing through the sharp edge.

25. A measuring device for the flow metering of gas streams present in internal combustion engines having at least one solid plate and having an orifice defined by a sharp, radially inwardly directed edge and a pipe, the gas being guided through said orifice disposed in said pipe and said plate being of a substantially rigid material, at least partially defined by opposite, substantially parallel sides facing flow directions through the pipe, a differential pressure measuring device, said device comprising pressure sensors, wherein a first pressure sensor is disposed upstream and a second pressure sensor is disposed downstream of said orifice, said differential pressure measuring device being adapted to produce output signals depending on the differential pressure forming the measuring signal for the gas flow rate of pulsating gas streams through said orifice, said orifice being symmetrically formed in a zone of the sharp edge with respect to a plane passing through the sharp edge of the orifice by first and second substantially flat surfaces which converge at an angle of no more than about 110° to thereby provide the sharp edge with a flank angle $\alpha$ of 110° at most at the flow orifice.

26. A measuring device according to claim 25, wherein the flank angle $\alpha$ is between 70° and 110° at the flow orifice.

27. A measuring device according to claim 25, wherein the flank angle $\alpha$ is 90° at most at the flow orifice.

28. A measuring device for the flow metering of fluid streams having at least one solid plate having an orifice defined by a sharp, radially inwardly directed edge and a pipe, the fluid being guided through said orifice disposed in said pipe, said plate being of a substantially rigid material, at least partially defined by opposite, substantially parallel sides facing flow directions through the pipe, a differential pressure measuring device, said device comprising pressure sensors, wherein one pressure sensor is disposed upstream and one pressure sensor is disposed downstream of said orifice, said differential pressure measuring device being adapted to produce output signals depending on the differential pressure forming the measuring signal for the fluid flow rate of pulsating fluid streams through said orifice, said orifice being symmetrically formed in the zone of the sharp edge in relation to a plane passing through the sharp edge of the orifice of the plate and having a flank angle $\alpha$ of the sharp edge of about 110° at most at the flow orifice defined by first and second, substantially flat, converging surfaces of the plate.

29. A measuring device according to claim 28, wherein the flank angle $\alpha$ is between 70° and 110° at the flow orifice.

30. A measuring device according to claim 28, wherein the flank angle $\alpha$ is 90° at most at the flow orifice.

31. A measuring device for metering of fluid flow, said measuring device comprising a restrictor adapted to be inserted into a longitudinal pipe section and further comprising pressure sensors disposed upstream and downstream of said restrictor, said restrictor comprising at least one solid plate having an orifice defined by a sharp, radially inwardly directed edge, said plate being of a substantially rigid material, at least partially defined by opposite, substantially parallel sides facing flow directions through the pipe, the orifice being formed by first and second, in cross-section, straight surfaces which converge at the sharp edge with a flank angle between about 70° and 110° to thereby define a like flank angle at the orifice, said pipe section having a plane perpendicular to its longitudinal axis and positioned through said orifice, said plate comprising a plane of symmetry passing through said sharp edge.

32. The measuring device as recited in claim 31 wherein said sharp edge comprises an angle directed radially inwardly with respect to said pipe section.

33. The measuring device as recited in claim 32 wherein said angle is at most 110° at the flow orifice.

34. The measuring device as recited in claim 32 wherein said angle is 70° at the flow orifice.

35. The measuring device as recited in claim 32 wherein said angle is at most 90° at the flow orifice.

36. The measuring device as recited in claim 31 further comprising an outer ring disposed between said pipe section and said orifice plate.

37. The measuring device as recited in claim 36 wherein said orifice plate includes a thickened portion connecting said sharp edge and said outer ring.

38. A measuring device for metering of fluid flow, said measuring device comprising a restrictor adapted to be inserted into a longitudinal pipe section and further comprising pressure sensors disposed upstream and downstream of said restrictor, said restrictor comprising at least one plate orifice having a sharp edge, said pipe section having a plane perpendicular to its longitudinal axis and positioned through said plate orifice, said plate comprising a plane of symmetry passing through said sharp edge, and wherein said orifice plate includes two parallel side faces.

39. A measuring device according to claim 1, wherein said plate orifice comprises a one-piece plate orifice.

40. A plate orifice according to claim 19 comprising a one-piece plate orifice.

41. A measuring device for the flow metering of fluid streams comprising at least one orifice plate disposed within a pipe, said fluid being guided through a flow orifice defined by an opening in the orifice plate, the orifice plate including a solid plate constructed of a substantially rigid material defined by substantially parallel opposite sides facing in the flow directions through the pipe, first and second, radially inwardly converging, in cross-section substantially flat surfaces which converge at an angle no more than about 110° in a plane of the orifice perpendicular to the axis through the pipe and form a sharp edge in the plane of the orifice, the surfaces being symmetric relative to the orifice plane and extending from the orifice plane to the respective sides of the orifice plate, said measuring device further including a differential pressure measuring device comprising at least two pressure sensors, one of said pressure sensors being disposed upstream and one pressure sensor being disposed downstream of said plate orifice, said differential pressure measuring device including means for producing output signals dependent upon the differential pressure forming a measuring signal for the fluid flow rate through said orifice.

* * * * *